No. 692,132. Patented Jan. 28, 1902.
W. GATES.
CHECKREIN HOLDER.
(Application filed Feb. 2, 1901.)
(No Model.)
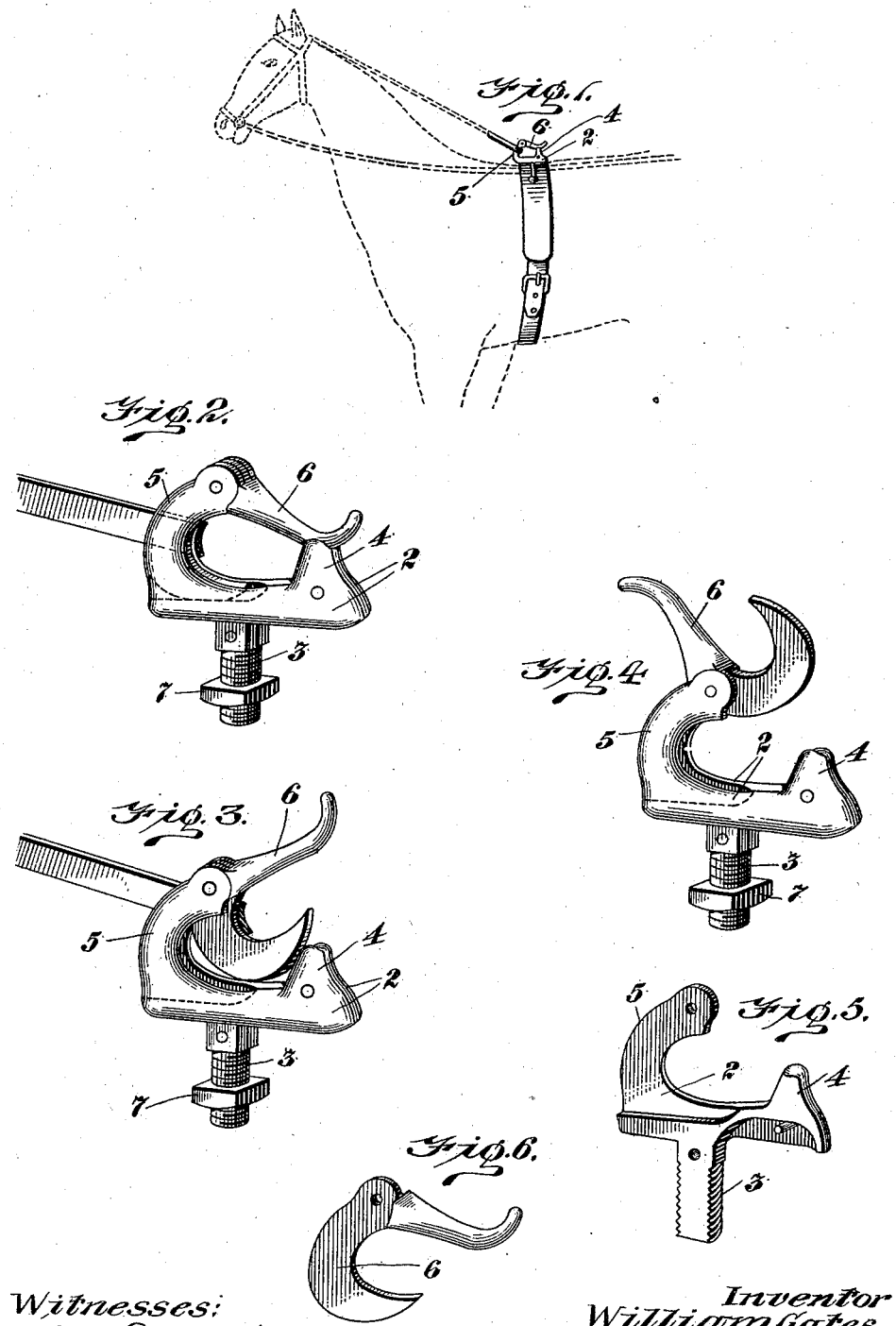

UNITED STATES PATENT OFFICE.

WILLIAM GATES, OF WOODBRIDGE, CONNECTICUT, ASSIGNOR OF ONE-HALF TO JOHN H. BARNES, OF NORWICH, CONNECTICUT.

CHECKREIN-HOLDER.

SPECIFICATION forming part of Letters Patent No. 692,132, dated January 28, 1902.

Application filed February 2, 1901. Serial No. 45,684. (No model.)

*To all whom it may concern:*

Be it known that I, WILLIAM GATES, a citizen of the United States, residing in Woodbridge, in the county of New Haven and State of Connecticut, have invented certain new and useful Improvements in Checkrein-Holders, of which the following is a specification.

This invention relates to a checkrein-holder for a harness, and has for its object to provide a holder which will retain the checkrein securely when closed and automatically release said rein when opened, and which, by reason of its elongated base in engagement with the saddle throughout its under surface, may be made very light, and yet will sustain a considerable strain. This object is preferably accomplished by constructing the checkrein-holder in three parts, two of such parts forming the base of such holder and provided with means for attachment to the saddle of a harness, and the third part being pivotally connected with such base and having its upper part adapted to close the opening of said holder and to retain the rein in such holder and the lower part adapted to be inclosed by the base and to throw the rein upward and outward when raised.

In the drawings accompanying and forming part of this specification, Figure 1 is a view showing the invention applied to a harness. Fig. 2 is a perspective of the invention closed, one side of the rein being cut away. Fig. 3 is a similar view showing the invention partly open. Fig. 4 is a similar view showing the invention fully open, and Figs. 5 and 6 are detail views of parts of said invention.

Similar characters of reference designate corresponding parts in the different figures of the drawings.

This invention is preferably constructed of twin members 2, forming the base, each of said members being shown with its rear inner under surface hollowed out and a shank 3 depending from the middle part of such under surface, such shank 3 having its upper part preferably rectangular in cross-section and its lower part half-round and screw-threaded on such half-round surface, complementary to screw-threads on the shank of the other twin member. From the rear upper surface of each of said twin members 2 there rises a projection 4, having the inner surface of its upper part slightly cut away, and from the forward outer upper surface of each twin member 2 there rises an arm 5, slightly less in thickness than the base of such twin member 2, said arm 5 being curved backward. The base of such twin members 2 is elongated, whereby the surface in engagement with the saddle is relatively of considerable length, and hence the strain of the checkrein is distributed over a relatively large surface and the holder is less likely to be pulled over in case the saddle is loose. The third part 6 is preferably constructed with its lower part in the shape of a flat hook adapted when the parts are assembled to pass between the arms 5, and its upper part forming a round handle having its end turned slightly away from said hook. The shoulder formed where the handle joins the hook serves to engage the arms 5 and prevents the part 6 going over too far when the rein is released.

The parts 2 and 6 are assembled by placing part 6 between the arms 5 of parts 2 and pivoting part 6 to the ends of arms 2 and riveting or otherwise suitably fastening parts 2 together. The device can then be attached to any harness by inserting the shank 3 through the saddle and securing it in place, preferably by a nut 7 or in any other suitable manner.

The operation of the invention is as follows: The part 6 being turned upward and forward the rein is placed in the hook and the part 6 turned backward and downward, when the rein holds it in its closed position. When it is desired to release the rein, it is only necessary to raise the handle of the part 6.

The device may be constructed in other ways—as, for instance, with a single arm and the hook member attached at the side of such arm, or such arm may be bifurcated and the hook member placed in such bifurcation, or the base may be of a single piece. The features of the invention are the elongated base, the hook member, and the fact that the rein holds it closed and that it releases the rein when opened.

Having thus described my invention, I claim—

The herein-described checkrein-holder comprehending an elongated base adapted to engage the saddle throughout its entire surface whereby greater resistance is offered to the strain of the checkrein, said holder being formed in three parts comprising twin base members, each having a shank depending therefrom, and each of said members having an upward projection at the rear having its upper inner part cut away, and a backward curved arm on its forward part, said arm and the forward upper inner surface of said member being cut away, and a third member comprising a flat pointed, hook-shaped portion and a handle portion, said three parts adapted to be assembled with the twin members forming the base and support for the hook member which is pivoted between the arms and, when closed, its hook portion fills the hollow between said arms and the recess in the base and its handle portion rests in the hollowed-out top of the rear projection.

WILLIAM GATES.

Witnesses:
CHAS. G. HARRISON,
GEORGE W. SWAN.